P. RAINES.
Seed Planter.
No. 12,783.
Patented May 1, 1855.
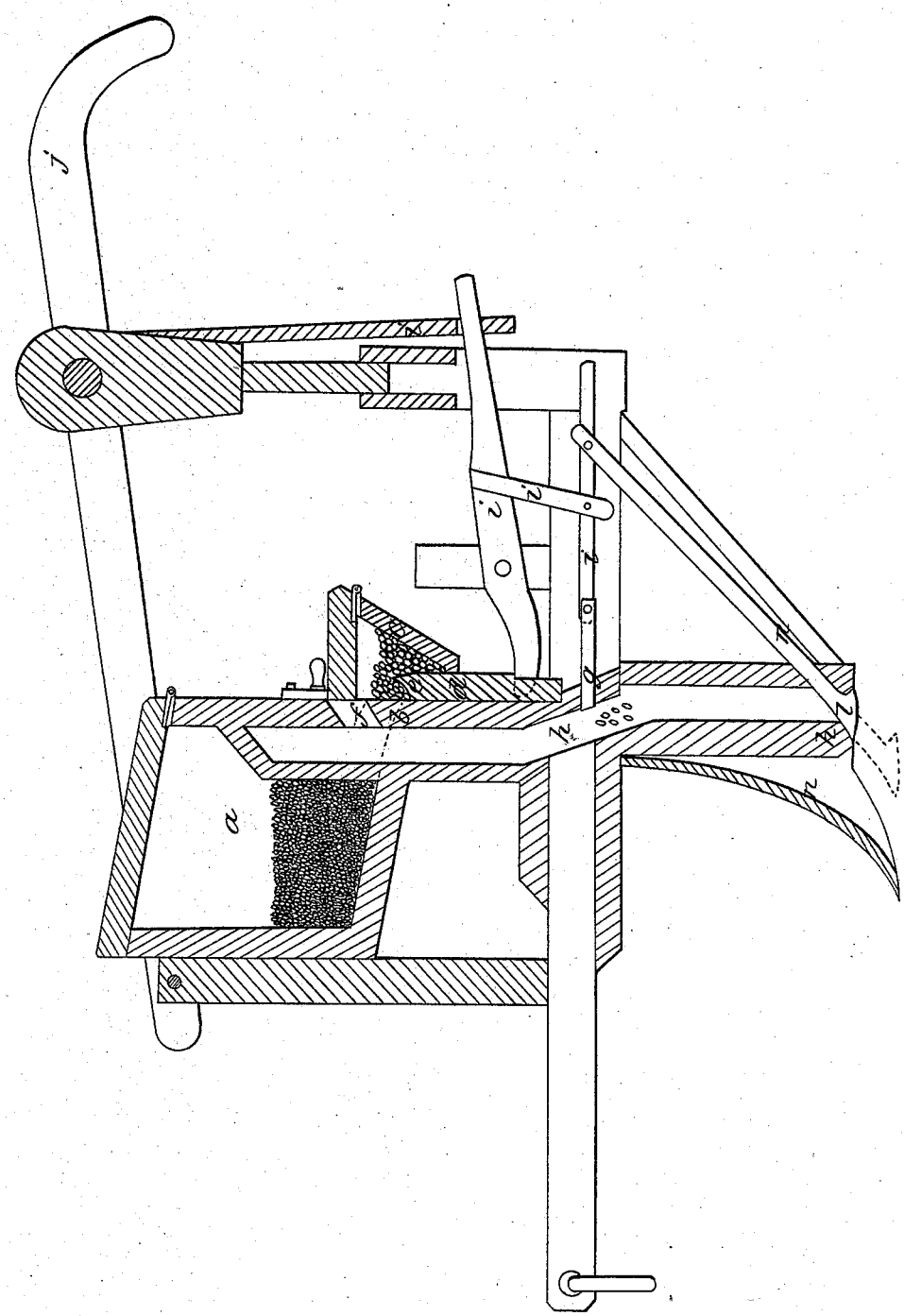

UNITED STATES PATENT OFFICE.

PRESLEY RAINES, OF LONDON, OHIO.

IMPROVEMENT IN CORN-PLANTERS.

Specification forming part of Letters Patent No. 12,783, dated May 1, 1855.

*To all whom it may concern:*

Be it known that I, PRESLEY RAINES, of London, Madison county, Ohio, have invented new and useful Improvements in Corn-Planters; and I do hereby declare the following to be a full, clear, and exact description thereof, reference being had to the annexed drawing, making part of this specification, and in which my machine is represented by a longitudinal section.

The objects of my invention are, first, the proper supply of grain to the feeding-piston; second, facility for correct planting and distribution of grain in the hill; third, certainty of action in stiff or heavy ground.

*a* is a box forming a reservoir for the corn. This box has at its lower portion free communication by spout or spouts (see dotted lines *b*) with a hopper, *c*. The effect of this arrangement is that as fast as the hopper empties it is replenished by the descent of more corn from the reservoir, so that so long as there remains any seed in the latter the supply in the hopper will continue to stand as high as the muzzle of the spout. This is necessary to the perfect action of the corn-lifter, which consists of a small piston, *d*, sliding up and down close against the back of the hopper, and formed at top into a hollow cup, *e*, capacitated for elevating at each ascent the proper number of grains, which, dropping over the margin of the aperture *f*, fall upon a platform, *g*, extending across the drill-spout *h*.

The elevation of the piston *d* and the closing the platform *g* are effected simultaneously by the depression of the handles *j* through the medium of suitable levers and rods, *i*. The same movement also protrudes the plunger *k*, so as to leave an annular opening between its flaring surface *l* and the corresponding flaring vent of the drill-spout *h*. By this means the charge of grain that had been retained within the drill-spout by the plunger is allowed to drop out.

The flaring form given to the plunger serves the useful purpose of suitably scattering the grain upon the hill. This flaring foot also, by preceding the seed, pulverizes and depresses a suitable bed for its reception, and insures the proper relative disposition of the seed and of the soil, and this, whether the ground be impervious by reason of its stiffness, or be so loose as to fill up immediately after the share *n*. This flaring foot is also of use to keep the drill-spout open and clear of obstructions, even in wet clayey soil.

By dropping the seed immediately at the surface of the ground greater exactness is secured than in the usual devices for this purpose, in which the grain has to descend some distance down a tube or shute.

It will be seen by reference to the drawing that the sudden elevation of the handles will result in the sliding back of the platform, and simultaneously therewith the descent of the lifter preparatory to picking up another charge of grain, and, the handles being allowed to drop, the platform is thereby reinserted, and at the same time and by the same movement the piston, ascending with a fresh charge, drops it onto the platform. The operator having hold of the handles in the act of guiding the implement, it becomes perfectly easy with a little practice to elevate and depress the handles at the right time.

By means of this machine a field in which the corn has sprouted unevenly may be gone over, and fresh seed be planted in the vacant hills.

This arrangement is for hill-planting preferable to those devices in which the seed is dropped by automatic action, because from irregularities of surface and otherwise the cross-rows always get out of line, and consequently the crop can be worked only in one direction. There will also be superseded the necessity, now usual in the use of corn-planting machines, of making allowance for the descent of the grain, which, notwithstanding such precautions, often misses the mark.

I claim as new and of my invention—

The combination of elevator, sliding platform, and flaring plunger, substantially as described, operated simultaneously by the elevation and depression of the guiding-handles.

In testimony whereof I hereunto set my hand before two subscribing witnesses.

PRESLEY RAINES.

Witnesses:
  P. BUTLER,
  I. C. SMITH.